United States Patent Office 3,216,951
Patented Nov. 9, 1965

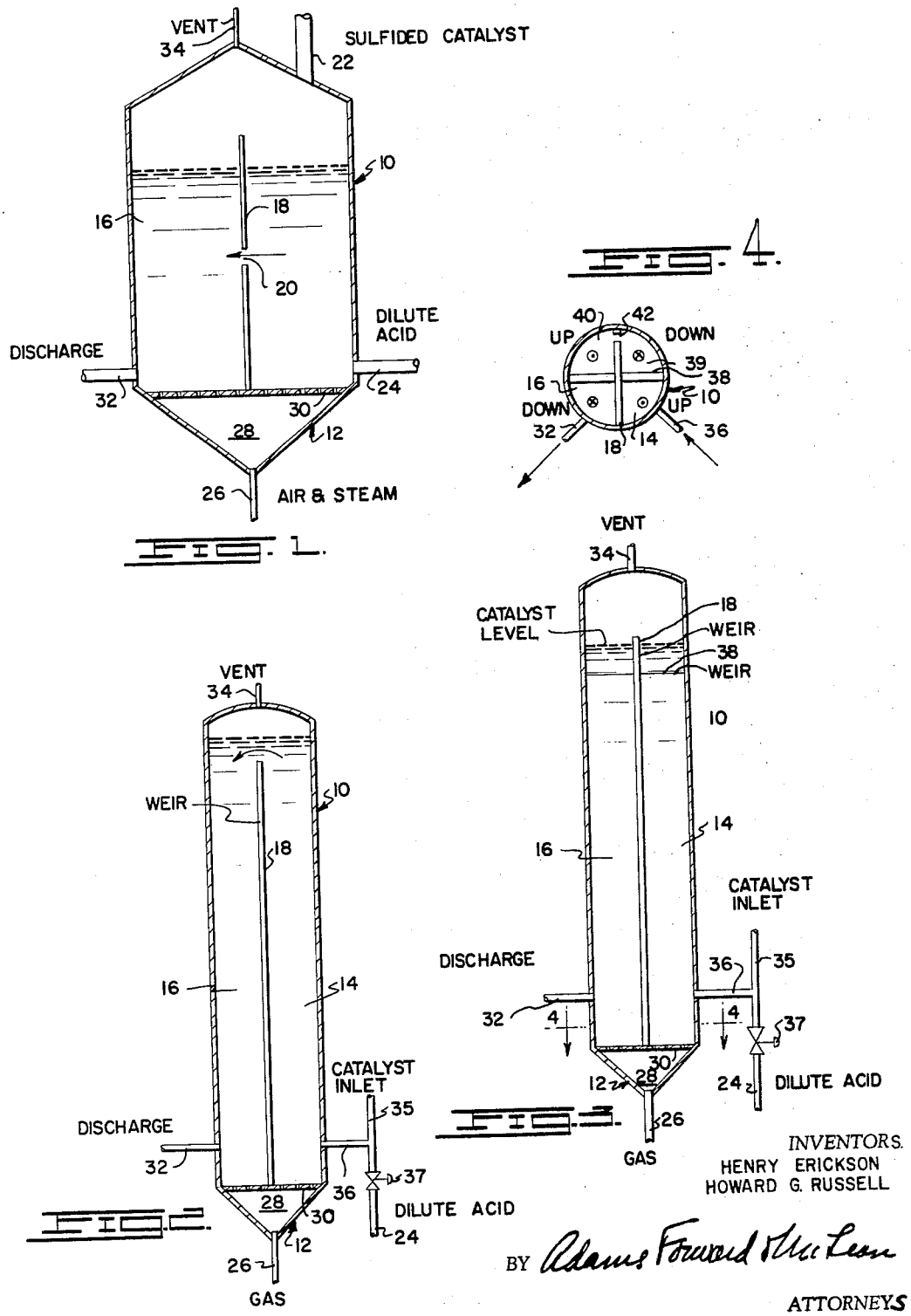

3,216,951
SOLIDS CONTACT APPARATUS AND METHOD FOR EFFECTING THE CONTACT
Henry Erickson, Park Forest, Ill., and Howard G. Russell, Munster, Ind., assignors, by mesne assignments, to Sinclair Research, Inc., New York, N.Y., a corporation of Delaware
Filed Jan. 19, 1961, Ser. No. 94,957
18 Claims. (Cl. 252—413)

This invention concerns a method for the continuous contacting of a granular solid with a liquid and a gas and an apparatus for performing the contacting. The invention particularly concerns apparatus and processing techniques utilizing gases as contacting, oxidizing and heating aids in solid-liquid contacting.

Although numerous mechanical devices for stagewise contacting and treating of particulate solids with liquids have been proposed, such prior art devices have generally been recognized as having various limitations. For example, most of such devices are mechanically complicated and expensive to build, particularly in large sizes. The limit of the number of stages which can be incorporated in such devices often falls below the number required for optimum contact. Uniformly effective contact of the treating liquid with all of the solids is frequently uncertain. Further, known devices usually do not provide for simultaneous or alternate gas contact.

The apparatus of this invention is mechanically simple and economical to build; the number of treating stages is sufficient for optimum contact and obtains effective contact between the granular solid, for example a solid oxide hydrocarbon conversion catalyst, and the liquid and/or gas components which, for example, may make up an aqueous oxidizing medium. Further, this invention provides an attractive solid-liquid contacting process wherein a slurry is formed and moves from zone to zone under the influence of gases introduced into the zones, without undue back mixing or inter-mixing of particles.

The present invention concerns a solids contacting apparatus in which gases are employed alone or together with a liquid to impart and maintain efficient heat and agitation of solid particles, to effect chemical reactions, such as the oxidation of a metal contaminant-containing particulate catalyst, and to aid in the flow and handling of the solid particles from compartment to compartment.

The apparatus of this invention comprises an upper cylindrical chamber joined to a lower conical-shaped bottom by a porous plate member. The cylindrical chamber is divided into compartments by one or more weirs which are in fluid-tight engagement with the porous plate and which provide passage for transfer of the slurry from one compartment or stage to the next. The components of the slurry, the catalyst and the liquid, are introduced into the cylindrical chamber through conduits which lead to the first of a series of compartments. Near the bottom of the upper chamber there is also provided a conduit through which the treated catalyst is discharged from the reactor. This outlet conduit is in communication with the last of the series of compartments. The top of this upper chamber is provided with vent means for escape of reactor effluent vapors. At the apex of the conical-shaped bottom or plenum chamber there is provided a conduit which serves as an inlet for the gases which pass through the porous plate into all of the compartments of the upper chamber. The porous plate is provided for the purpose of effecting uniform distribution of the gas in all compartments. The plate may be fabricated from porous carbon, silica or metal, for instance, "Carbocell" or any other material sufficiently porous to permit flow therethrough of a gas, yet not so porous as to permit escape of the liquid component when such is used as one of the embodiments of this invention. The average percent porosity of these materials is usually about 25 to 50 percent with average pore diameters ranging from about 20–70 microns.

In the preferred embodiment of this invention each weir in the uper chamber is provided with an aperture positioned below the level of a slurry maintained in the reactor, to permit transfer of the slurry from compartment to compartment. Also, preferably, the conduit through which the catalyst is introduced to the first compartment is located at the top of the upper chamber and the conduit through which the liquid component of the oxidizing medium is introduced into the said first compartment is positioned near the bottom of the upper chamber.

Alternatively, the weir need not be provided with an aperture; in this instance, the top of the weir is positioned below the level of the slurry and catalyst passage from compartment to compartment is effected by weir overflow. Also, the catalyst and the liquid component of the oxidizing medium may both use a common inlet positioned near the bottom of the upper chamber. This common conduit leads, to the first compartment, a slurry created prior to introduction into the reactor. However, separate conduits may be provided. This particular modification is also adaptable to procedures involving only gaseous reactions.

In yet another modification of the invention the upper chamber is divided into quadrants by two mutually perpendicular weirs. The top of one of these weirs is positioned below the level of the catalyst maintained within the reactor. This weir preferably partitions the first from the second compartment and the third from the fourth compartment. Passage of the catalyst from the former to the latter of these sets of compartments is effected by weir overflow. The other weir partitions the second from the third compartment and the fourth from the first compartment. The top of this weir is positioned above the level of the catalyst. Passage of the catalyst from the second to the third compartment is effected through an aperture located near the bottom of the weir. The catalyst and liquid component inlets leading to the first of these four compartments are substantially the same as those discussed above. The outlet for the treated catalyst in this modification leads from the last compartment and is located near the bottom of the cylindrical chamber.

The apparatus of this invention is ideally suited for carrying out an aqueous oxidizing wash procedure for the removal from solid oxide hydrocarbon conversion catalysts of metals, e.g. Ni and V, which poison the catalytic activity of the catalysts. Such a procedure usually includes contacting the contaminated catalyst with a sulfiding agent before the wash to put the metal contaminant in the sulfide form, as disclosed in copending application Serial No. 842,618, filed September 28, 1959, now abandoned, incorporated herein by reference.

The sulfiding treatment can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., perferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximating 1 atmosphere or less seem near optimum for sulfiding, and this treatment often continues for at least 1 or 2 hours.

The metal poisons may then be converted to a dispersible form by a liquid aqueous oxidation medium. Such an oxidizing medium may consist of water, with or without the addition of small amounts of, preferably mineral, acids, to which chlorine, air, ozone or other molecular oxygen-containing gases may be added. The inclusion in the liquid aqueous oxidizing solution of nitric acid provides for increased vanadium removal, especially when the sulfiding is preceded by a treatment of the catalyst at elevated temperature with a molecular oxygen-containing gas.

The aerated dilute nitric acid solution in water generally has a pH less than about 4 and is provided by continuously bubbling air into a slurry of the catalyst in very dilute nitric acid. No difference in effect has been found when the rate of air introduction to an aqueous oxidizing solution is varied in the range of about 1/6 to 1 cubic feet per minute per lb. of catalyst. Hence, this is not considered to be a controlling factor. Other oxygen-containing gases may be substituted for air. Also, varying oxygen partial pressure in the range of about 0.2 to 1.0 atmospheres appears to have no effect in shortening the time required for oxidation, which is generally at least about 7 to 8 minutes. The oxidation slurry may contain about 20% solids and provide about five pounds of nitric acid per ton of catalyst. Up to about 10 pounds of nitric acid may be required when commercially treated water, which is slightly basic, is employed. Otherwise, studies have shown a greater concentration of $HNO_3$ to be of no significant advantage. The conditions of oxidation can be selected as desired. The temperature can conveniently range up to about 220° F. with temperatures of above about 150° F. being preferred. Temperatures above about 220° F. necessitate the use of superatmospheric pressures and no need for such has been found. The apparatus of this invention can provide for the introduction of steam into the slurry of catalyst in the dilute aqueous nitric acid along with air or other oxidizing gas to maintain the desired temperature.

The flow of gas and liquid into the vessel is correlated so as to maintain the catalyst particles in the form of a moving body, and the flow rates and the size of the vessel utilized are determined by the residence time required for reaction completion. The size of the compartments, therefore, determines the ideal slurry velocity within the compartments, the two factors being inversely proportional to each other. The determination of these factors is generally the result of economic considerations and advantageously may be chosen by the operator with the view of obtaining the optimum results for the minimum cost.

Treatment of regenerated catalyst with molecular oxygen-containing gas is preferably employed to improve the removal of vanadium, and probably nickel as well, from the poisoned catalyst. This treatment is described in copending application Serial No. 19,313, filed April 1, 1960, now abandoned, and is preferably performed at a temperature at least about 50° F. higher than the regeneration temperature, that is, the average temperature at which the major portion of carbon is removed from the catalyst. The temperature of treatment with molecular oxygen-containing gas will generally be in the range of about 1000 to 1800° F. but below a temperature where the catalyst undergoes any substantial deleterious change in its physical or chemical characteristics, preferably a temperature of about 1150 to 1350° or even as high as 1600° F. The duration of the oxygen treatment and the amount of vanadium prepared by the treatment for subsequent removal is dependent upon the temperature and the characteristics of the equipment used. If any significant amount of carbon is present in the catalyst at the start of this high-temperature treatment, the essential oxygen contact is that continued after carbon removal, which may vary from the short time necessary to produce an observable effect in the later treatment, say, a quarter of an hour to a time just long enough not to damage the catalyst. In any event, after carbon removal, the oxygen treatment of the essentially carbon-free catalyst is at least long enough to stabilize a substantial amount of vanadium in its highest valence state, as evidenced by a significant increase, say at least about 10%, preferably at least about 100%, in the vanadium removal in subsequent stages of the process. This increase is over and above that which would have been obtained by the other metals removal steps without the oxygen treatment. The maximum practical time of treatment will vary from about 4 to 24 hours, depending on the type of equipment used. The oxygen-containing gas used in the treatment contains molecular oxygen as the essential active ingredient and there is little significant consumption of oxygen in the treatment. The gas may be oxygen, or a mixture of oxygen with inert gas, such as air or oxygen-enriched air, containing at least about 1%, preferably at least about 10% $O_2$. The partial pressure of oxygen in the treating gas may range widely, for example, from about 0.1 to 30 atmospheres, but usually the total gas pressure will not exceed about 25 atmospheres.

In demetallizing a catalyst using the apparatus of this invention and a liquid oxidizing medium, the sulfided metal contaminated catalyst is mixed with the liquid component of the oxidizing medium to form the catalyst slurry either inside or outside the reactor. The solid may have a wide range of particle size. It is possible to use solid catalysts ranging in size to as much as 1/8 inch in diameter or somewhat greater. It is preferred, however, that the solids be no finer than about 200 mesh and for best results reasonably well classified material should be used. This invention enables the gaseous component of the oxidizing medium to impart and maintain agitation of the slurry resulting from mixture of the liquid component of the oxidizing medium and the introduced sulfided catalyst, and to promote side-to-side, or compartment-to-compartment movement of the liquid-solid slurry. Steam is frequently introduced with the oxidizing gas. The steam, likewise, serves a dual purpose in supplying heat to and aiding the agitation of the slurry.

When the slurried particles are transferred from compartment to compartment through apertures in the weirs, the size of the aperture will be chosen in view of a number of considerations; for instance, the desired residence time for catalyst in the vessel, and the rate of catalyst withdrawal from the hydrocarbon conversion reactor, regenerator and sulfider. The aperture is small enough to prevent undue inter-mixing or back mixing of the slurry from one compartment to another. It has been found that an aperture with a diameter range of about 2 in. to 6 in. generally may be employed, and may be employed, and may be properly determined by the operator.

The accompanying drawings illustrate preferred embodiments of the invention and modifications thereto.

In the drawings, FIGURE 1 is a vertical cross-section of a cylindrical reaction vessel embodying the invention;

FIGURE 2 is a vertical cross-section of another modification of the reactor of this invention;

FIGURE 3 is a vertical cross-section of yet another modification of the invention; and FIGURE 4 is a section on line 4—4 of FIGURE 3.

Referring to FIGURES 1 and 2 of the drawings, the reaction vessel comprises an outer upper cylindrical shell 10 with a lower conical-shaped bottom 12. The vessel and its component parts may be made of stainless steel or any other suitable material chemically resistant under reaction conditions. The cylindrical shell 10 is divided into two compartments 14 and 16 by a vertical weir or weirs 18. In the embodiment of FIGURE 1, this weir has an aperture 20 positioned below the level of the catalyst slurry and such that a vertical plane normal to the weir would bisect the weir and intersect the opening. The vessel may advantageously be provided with a plurality of weirs to form any number of compartments desired. A solids intake conduit 22 leads to a first compartment in the upper chamber and is in communication with a sulfiding chamber (not shown). The liquid intake conduit 24 is positioned near the bottom of the upper chamber and is in communication with a source (not shown) of a dilute nitric acid solution or any other suitable reagent which when aerated will form the liquid oxidizing agent. An air and steam inlet conduit 26 is provided to the conical-shaped plenum chamber 28 which is defined by the porous reactor bottom 30. An outlet conduit 32 is provided for removing the treated catalyst from the last compartment of the reactor. The cylindrically-shaped chamber is also equipped with vent means 34 to faciliate removal of effluent products from the reactor and conveniently may lead to the atmosphere or to a scrub tower or any other means to minimize the discharge of polluting gases.

In the preferred embodiment of the invention the solids intake conduit 22 is positioned at the top of the reaction vessel. As a modification of the invention, a solids intake conduit 35 may be positioned near the bottom of the upper chamber in communication with slurry inlet line 36, which leads to the first of the heretofore described series of compartments. The liquid inlet conduit 24 is also in communication with line 36 and, when only gas contact processes are performed in this apparatus, valve 37 in line 24 will be closed.

In the embodiment illustrated in FIGURE 2, the weir 18 is not provided with an aperture. Rather, the weir extends upwardly to a position below the desired upper level of catalyst in the vessel and slurry passage is by weir overflow. In another embodiment of the invention, the upper chamber of the vessel may be divided into quadrants by mutually perpendicular vertical weirs 18 and 38. In this modification, shown in FIGURES 3 and 4, the weir 18 extends above the level of the fluidized catalyst or the catalyst slurry, when liquid treatment is employed, and weir 38 is below the same level to permit transfer of the solids by overflow of weir 38 from the first to the second quadrant. Communication between the second and third quadrants which form compartments 39 and 40, respectively, is effected by an aperture 42 in weir 18. This aperture is positioned near the bottom of the weir. The outlet conduit 32 for the treated catalyst is positioned near the bottom of the fourth quadrant which forms the last compartment 16.

In the preferred operation of the embodiment shown in FIGURE 1, a previously sulfided metal-contaminated catalyst falls down through pipe 22. The addition of the catalyst, having the high temperature of the sulfidation, is frequently sufficient to impart to the resulting slurry the almost boiling temperature at which the oxidation is effectively conducted. This temperature may conveniently be maintained by introduction of steam into the system. Alternatively, the sulfided catalyst may be slightly cooled before introduction into the reaction vessel to avoid undue vaporization of the liquid component of the oxidizing medium. The catalyst flows through conduit 22 into compartment 14. The liquid component of the oxidizing agent, flowing through conduit 24, enters the bottom of the vessel to form a slurry with the catalyst. Effective contact between the catalyst and the liquid component of the oxidizing agent is achieved by agitation due to the air and steam flowing from conduit 26 through the plenum chamber 28, and through the porous bottom 30. This arrangement obviates the need for mechanical mixers in the reaction vessel. Aeration of the liquid forms the oxidizing medium. The weir 18, the top of which is above the level of the catalyst slurry, is in fluid tight engagement with the porous bottom 30 and the only means of egress of the slurry from compartment 14 is through the aperture 20 in the weir. Motion and heat are again imparted to the catalyst particles passing to compartment 16 where oxidation is continued in the same manner as in compartment 14. When, as shown in this embodiment, only two stages are provided, the oxidized catalyst slurry is led from the final stage through conduit 32 back to the hydrocarbon conversion reactor perhaps by way of a filter (not shown) and a subsequent washing operation.

The apparatus, as modified herein, may be employed not only for liquid oxidation procedures but also in such fluid catalyst demetallization gas contact processes as oxygen treatment, sulfiding, etc. When the apparatus is utilized in liquid contact procedures, valve 37 is opened and the inlet streams of catalyst and liquid component of the oxidizing medium are slurried before entrance into the upper chamber. When the apparatus is employed in gas contact procedures, valve 37 is closed and the inflowing catalyst, from a sulfider, as an example, is treated by the vapors introduced to the upper chamber through conduit 26, plenum chamber 28 and porous plate 30. This modification provides excellent contact and transfer of the catalyst, optimum residence time of the catalyst undergoing treatment in the reactor and minimum catalyst by-passing.

In the modification of FIGURES 3 and 4 the flow path of the catalyst slurry effected by contact with the air and steam is upward in compartment 14 with weir overflow into compartment 39, transfer to compartment 40 through the aperture 42 in that portion of weir 18 that separates compartments 39 and 40, upward in compartment 40 with weir overflow into compartment 16 and discharge from this compartment through conduit 32 positioned near the bottom of the upper chamber. The flow path of the treated catalyst is substantially the same as that of the above slurry flow path when essentially gaseous treatments are employed.

This invention should be understood to cover all changes and modifications of the embodiment herein chosen for purposes of disclosure which do not constitute departures from the spirit and scope of the invention.

*Example*

The apparatus of this invention was employed in treating a poisoned cracking catalyst with aerated nitric acid. The cracking catalyst had a size range of about 20 to 150 microns and comprised a synthetic gel silica-alumina composite containing about 13% alumina. This catalyst was introduced to a cracking reactor along with a vacuum residuum derived from a West Texas crude oil and having an API gravity of 15.1, a Conradson carbon content of about 8.8 weight percent, a viscosity of about 400 seconds Saybolt at 210° F., and an initial boiling point above about 1000° F. and containing 24.7 p.p.m. of nickel, 39.9 p.p.m. of vanadium and 21.3 p.p.m. of iron. In the reactor the hydrocarbon and solid catalyst are heated to about 850° F. at a pressure of about 8 p.s.i.g. and a WHSV of about 15. Under these conditions, a 30–40% conversion of the feed to lighter materials is effected with the effluent being substantially free of the metal contaminants along with the associated coke formers. Catalyst is taken from the reactor and its carbon content is reduced from about 2 to 0.5 weight percent through contact with air in the regenerator.

A slip stream of regenerated catalyst analyzing 0.5% coke, 370 p.p.m. nickel, 1300 p.p.m. vanadium and 840 p.p.m. iron is continuously withdrawn from the regenerator at a daily inventory rate of 75% and sent to demetallization where it is held for about 2 hours in a zone where it is contacted with air at about 1300° F. and then sent to a sulfiding zone where it is fluidized with $H_2S$ gas at a temperature of about 1050° F. for about 2 hours. The sulfided catalyst is discharged to a cooler where the temperature of the catalyst is reduced to about 900° F. and introduced through the top of a two compartment reactor of this invention. A dilute aqueous solution of nitric acid enters first compartment of the reactor at a velocity of about 0.1 ft. per min. to mix with catalyst and form a slurry. Air and steam are admitted to the reactor through the plenum chamber and the porous plate at a rate of about 0.01 ft. per min. The heated, agitated and partially oxidized slurry passes from the first to last compartments through a 3 inch aperture in the partitioning weir and remains in the reactor for a total residence time of about 30 minutes. The catalyst is then discharged from the reactor and directed to a wash treatment effective to remove nickel and the available vanadium. The metals level of the cracking catalyst after demetallization analyzes 151 p.p.m. nickel, 950 p.p.m. vanadium and 650 p.p.m. iron.

It is claimed:

1. An apparatus for continuous oxidation of a sulfided metal-contaminated catalyst comprising a cylindrical chamber having a conical bottom separated from it by a porous plate, said plate being sufficiently porous to permit gas to flow therethrough but not so porous as to permit liquid to flow therethrough during use of said apparatus, said chamber separated into a plurality of compartments by a weir in fluid-tight engagement with the porous plate, said weir providing passage of catalyst to successive compartments, said chamber having a catalyst inlet leading to a first compartment, a liquid inlet positioned near the bottom of said chamber leading to said first compartment, a gas inlet leading to said concial bottom, a gas outlet leading from the upper portion of said cylindrical chamber and a catalyst discharge outlet leading from the last compartment of said chamber.

2. The apparatus of claim 1 in which passage of catalyst to successive compartments is through an aperture in the weir.

3. The apparatus of claim 2 in which the catalyst inlet is positioned near the top of said chamber.

4. The apparatus of claim 1 in which the catalyst inlet is positioned near the bottom of said chamber.

5. An apparatus for continuous oxidation of a sulfided metal-contaminated catalyst comprising a cylindrical chamber having a conical bottom separated from it by a porous plate, said plate being sufficiently porous to permit gas to flow therethrough but not so porous as to permit liquid to flow therethrough during use of said apparatus, said chamber divided into a plurality of compartments by mutually perpendicular vertical weirs in fluid-tight engagement with the porous plate, said weirs providing passage of the catalyst to successive compartments, said chamber having a catalyst inlet leading to a first compartment, a liquid inlet positioned near the bottom of said chamber leading to said first compartment, a gas inlet leading to said conical bottom a gas outlet leading from the upper portion of said cylindrical chamber and a catalyst discharge outlet leading from the last compartment of said chamber.

6. The apparatus of claim 5 in which passage of the catalyst from the first to a second compartment is provided by weir overflow.

7. The apparatus of claim 5 in which passage of the catalyst from a second to a third compartment is through an aperture in the weir.

8. The apparatus of claim 5 in which the catalyst inlet is positioned near the bottom of the first compartment.

9. A process for effecting continuous contacting of liquids with granular solids in a plurality of contacting zones confined in a cylindrical chamber having a conical bottom separated from it by a porous plate which comprises: passing the solids into a first confined contacting zone, supplying a liquid feed material into the lower section of the said first confined contacting zone and passing it upwardly therethrough to effect a slurry with the solids, supplying a gas uniformly into the contacting zones to aid contacting and movement of the slurry from the first zone to a successive confined zone by way of said porous plate which is sufficiently porous to permit gas to flow therethrough passing the slurry from the first zone to said successive zone by way of a weir which separates the contacting zones, withdrawing the slurry from the last confined contacting zone at a level near the bottom of said confined zone and above the said gas supply, and withdrawing gas from said contacting zones.

10. The process of claim 9 in which the slurry is passed from zone to zone through an aperture in the weir.

11. The process of claim 9 in which the slurry is passed from zone to zone by weir overflow.

12. An apparatus for effecting continuous contacting of liquids with particulate solids in a plurality of confined contacting zones which comprises means for passing the solids into a first confined contacting zone, means for supplying a liquid feed material into the lower section of the said first confined contacting zone, means for supplying a gas uniformly into the contacting zones to aid in effecting a slurry from said solids and liquid and to aid movement of said slurry from the first zone to successive confined zones for allowing passage of said means comprising a plate which is sufficiently porous to permit gas to flow therethrough but not so porous as to permit liquid to flow therethrough during use of said apparatus, weir means in fluid-tight engagement with the porous plate for allowing passage of the slurry from the first zone to successive zones, said means separating the contacting zones, means for removing gas from said contacting zones and means for withdrawing the slurry from the last confined contacting zone, said withdrawing means positioned at a level near the bottom of said confined zone and above the said gas supply.

13. An apparatus for continuous treatment of a particulate solid comprising a cylindrical chamber having a conical bottom separated from it by a porous plate, said plate being sufficiently porous to permit gas to flow therethrough but not so porous as to permit liquid to flow therethrough during use of said apparatus, said chamber separated into a plurality of compartments by a weir in fluid-tight engagement with the porous plate, said weir providing passage of said solid to successive compartments, said chamber having a solids inlet leading to a first compartment, a liquid inlet leading to said first compartment, a gas inlet leading to said conical bottom, a gas outlet leading from the upper portion of said cylindrical chamber and a solids discharge outlet leading from the last compartment of said chamber.

14. A process for effecting continuous contacting of a liquid aqueous oxidizing solution with finely-divided, sulfided, nickel-contaminated, silica-alumina cracking catalyst in a plurality of contacting zones confined in a cylindrical chamber having a conical bottom separated from it by a porous plate to convert nickel contaminant to a form dispersible in a liquid aqueous medium which comprises passing the catalyst into a first confined contacting zone supplying the liquid oxidizing solution into the lower section of said first confined contacting zone and passing said liquid upwardly therethrough to effect a slurry with the catalyst, supplying a gas uniformly into the contacting zones to aid contacting and movement of the slurry from the first zone to a successive confined zone, by way of said porous plate which is sufficiently porous to permit gas to flow therethrough but not so porous as to permit liquid to flow therethrough, passing the slurry from the first zone to said successive zone by way of a weir which separates the contacting zones, withdrawing the slurry from the last confined contacting zone at a level near the bottom of said confined zone and above the said gas supply, and withdrawing gas from said contacting zones.

15. The process of claim 14 in which the gas supplied is a mixture of steam and air.

16. The process of claim 15 in which the slurry is passed from zone to zone through an aperture in the weir.

17. The process of claim 15 in which the slurry is passed from zone to zone by weir overflow.

18. The process of claim 15 in which the oxidizing solution is nitric acid and the temperature of contact is above about 150 to about 220° F.

References Cited by the Examiner

UNITED STATES PATENTS

| | | | |
|---|---|---|---|
| 1,700,698 | 1/29 | Fulweiler | 261—122 |
| 2,401,739 | 6/46 | Johnson | 23—288.3 X |
| 2,481,253 | 9/49 | Snyder | 252—415 X |
| 2,521,195 | 9/50 | Wheeler | 23—288.3 X |
| 2,527,198 | 10/50 | Rollman | 23—288.3 X |
| 2,586,818 | 2/52 | Harms. | |
| 2,754,273 | 7/56 | Shabaker | 252—413 X |
| 2,758,066 | 8/56 | Brackin | 23—288.3 X |
| 2,761,889 | 9/56 | May et al. | 23—285 X |
| 2,762,683 | 9/56 | Massey | 23—1 |
| 2,820,702 | 1/58 | James | 23—288 |
| 2,832,674 | 4/58 | Ranzenberger | 23—285 |
| 2,876,557 | 3/59 | Ducatteau | |
| 2,906,609 | 9/59 | Harper | 23—288.3 |
| 2,919,241 | 12/59 | Kelly et al. | 23—288.3 X |
| 2,990,238 | 6/61 | Kabisch et al. | 23—1 |

MORRIS O. WOLK, *Primary Examiner.*

MAURICE A. BRINDISI, *Examiner.*

UNITED STATES PATENT OFFICE
CERTIFICATE OF CORRECTION

Patent No. 3,216,951                                November 9, 1965

Henry Erickson et al.

It is hereby certified that error appears in the above numbered patent requiring correction and that the said Letters Patent should read as corrected below.

Column 8, line 6, after "therethrough" insert -- but not so porous as to permit liquid to flow therethrough, --; line 27, for "zones for allowing passage of" read -- zones, --.

Signed and sealed this 25th day of October 1966.

(SEAL)
Attest:

ERNEST W. SWIDER                          EDWARD J. BRENNER
Attesting Officer                             Commissioner of Patents